United States Patent [19]

Harrell, Jr. et al.

[11] Patent Number: 4,731,744
[45] Date of Patent: Mar. 15, 1988

[54] POSITION SENSOR AND SYSTEM

[75] Inventors: John P. Harrell, Jr.; Douglas L. Michalsky, both of San Antonio, Tex.

[73] Assignee: Neal Hare, Katy, Tex.

[21] Appl. No.: 755,489

[22] Filed: Jul. 16, 1985

[51] Int. Cl.⁴ .................. G08C 21/00; G01B 11/00
[52] U.S. Cl. ................................ 364/560; 33/314; 356/375
[58] Field of Search .............. 364/560, 559; 250/561, 250/568; 356/374, 395, 375; 33/313, 314

[56] References Cited

U.S. PATENT DOCUMENTS

| | | | |
|---|---|---|---|
| 3,768,911 | 10/1973 | Erickson | 356/169 |
| 3,922,539 | 1/1975 | Carnes et al. | 250/568 |
| 4,163,970 | 8/1979 | Allinquant et al. | 340/686 |
| 4,337,653 | 7/1982 | Chauffe | 73/151 |
| 4,396,944 | 8/1983 | McKenney et al. | 358/107 |
| 4,429,219 | 1/1984 | Yochum et al. | 356/395 |
| 4,441,125 | 4/1984 | Parkinson | 358/213 |
| 4,531,230 | 7/1985 | Brogardh | 250/568 |

FOREIGN PATENT DOCUMENTS 1298754 12/1972 Australia .

OTHER PUBLICATIONS

1532 *Opticram*, Micron Technology, Inc., Boise, Id. 5/84.

*Primary Examiner*—Felix D. Gruber
*Attorney, Agent, or Firm*—Dodge, Bush & Moseley

[57] ABSTRACT

A position sensor for a moving member of a mechanical device is disclosed. The sensor includes an optical sensing means such as solid-state image sensor and illuminating means such as a plurality of light-emitting diodes, stationarily mounted to face scribing marks provided on the moving member. The microprocessor controlled image sensor generates a digital signal representative of the scribing marks on the moving member. A cable is provided between the position sensor and a remote digital computer which applies control and command signals to the sensor and receives the digital signal representation of the moving member scribing marks. The image is presented on a CRT screen allowing a human being a remote visual image of the position of the moving member. The remote digital computer also processes the received digital signal from each of the moving members and generates an alarm if the movement is greater than a predetermined amount.

36 Claims, 12 Drawing Figures

POSITION SENSOR AND SYSTEM

BACKGROUND OF THE INVENTION

1. Field of the Invention

This invention relates in general to a position sensor for remotely sensing the position of a moving member of a mechanical apparatus. More particularly, the invention relates to a sensor and system for remotely sensing the position of a moving element of a subsea apparatus such as a blowout preventer (BOP) ram or the like.

2. Description of the Prior Art

Prior art efforts for remote sensing of moving members of mechanical apparatus have included using magnetic reed switch technology. Such technology has had only limited success for remotely measuring the position of a movable member of an apparatus for at least three reasons. First, the high failure rate of mechanical switches leads to operator distrust of the system. Second, magnetic reed technology has in practice enabled only the determination of full open or full closed positions of a movable member of a mechanical apparatus (e.g., the ram piston of a ram BOP) and then without precision. Third, and possibly most importantly, magnetic reed switch technology has lead to ambiguous display indications when the system fails completely and especially when "soft" or incomplete failures occur leading to further operator distrust of the system.

3. IDENTIFICATION OF OBJECTS OF THE INVENTION

A primary object of this invention is to provide a sensor and system which will overcome the disadvantages identified above with respect to magnetic reed switch technology in the remote sensing of the position of a movable member of a mechanical apparatus.

It is a further object of this invention to provide a measurement sensor which will not only permit continuous monitoring of the movable member of a mechanical apparatus, but will also enable detection and unambiguous display of the position of the movable member with high resolution of the position between its normal fully open or fully closed position.

It is another object of this invention to provide a position sensor and system for remotely measuring the position of the ram piston of a ram BOP by remotely sensing a visual image of an extension shaft of the ram piston and reproducing it at a remote location.

It is another object of the invention to provide a position sensor and system for a movable member of a mechanical apparatus which is immune to false positives or false negatives of the apparatus itself.

It is another object of the invention to provide a position sensor and system which presents a remote visual image of the movable member itself.

SUMMARY OF THE INVENTION

The objects of the invention identified above as well as other advantages and features of the invention are incorporated in a novel position sensor and system for remotely sensing the position of a moving member of a mechanical apparatus. The position sensor includes scribing marks disposed on a portion of the moving member or on an extension of the moving member. Means are provided for illuminating the scribing marks. An optical sensing means is provided for generating an electrical signal representation of the scribing marks on the moving member. The illuminating means and the optical sensing means are stationarily mounted with respect to the mechanical device to face the scribing marks of the moving member. An electrical cable is provided to connect the illuminating means and the optical sensing means to a remote digital computer where the electrical signal is transformed into a reconstruction of the visual image of the scribing marks on an imaging device such as a cathode ray tube (CRT).

The optical sensing means preferably includes a dynamic random access memory mounted in a semiconductor package having a transparent lid. At least one lens is provided for focusing an image of the scribing marks illuminated by the illuminating means onto the random access memory. Preferably, the illuminating means includes six light emitting diodes (LEDS) secured in a lens board and disposed circularly about a central aperture in the lens board. A lens is disposed in the central aperture.

Where the sensor is to be used as in connection with a ram blowout preventer, the means for mounting the light emitting diodes and the dynamic random access memory includes a spool stationarily fastened to the ram blowout preventer. The moving member for this embodiment of the invention is an extension of the piston shaft of the ram BOP. A hole in the spool is provided through which the scribing marks on the piston extension are visible. A housing removably secured to the spool is provided about the hole. The light emitting diodes, the lens and the dynamic random access memory are disposed in the housing to face the hole in the spool in order to view the scribing marks of the ram piston extension.

According to the invention, the scribing marks provided on the movable member of the mechanical apparatus include a first area of a first optical shade where the first area has a straight line first boundary and a saw tooth wave second boundary. A second area of the first optical shade has two parallel sides which are longer than its other sides bounding the second area where the straight line first boundary of the first area is parallel to the longer sides of the second area. A third area of the first optical shade defines a stair-stepped area, the lowest step being aligned with the beginning of one of the saw teeth of the second boundary of the first area, where each succeeding step of the third area is aligned with the corresponding succeeding tooth of the first area secondary boundary. The base of the stair-stepped area is parallel to, but separated by a gap of a second optical shade, to the longer sides of the second area. The area between the saw tooth wave second boundary of the first area and the stair-steps of the third area define a fourth area of the second optical shade. Preferably, the first optical shade is black and the second optical shade is white.

According to the invention, the position sensor described above may be used in an indicator system for remotely sensing the position of the moving member of a plurality of subsea mechanical devices such as the ram BOPs on a subsea blowout preventer stack. The system described above is provided on an extension of the ram piston of each ram blowout preventer. A digital computer is disposed on an offshore platform, for example, for generating command signals to each of the optical sensing means and the illuminating means and for receiving a digital signal representation of the scribing marks from each of the mechanical devices. An offshore platform imaging device (such as a CRT), responsive to the digital computer, is provided for visually displaying a representation of any one of the scribing marks of the mechanical devices. A cable is provided between the platform disposed digital computer the light emitting diodes and the optical sensing device of the sensor mounted on one of the mechanical devices.

According to the invention, each of the optical sensors further includes a programmed microprocessor responsive to the command signals from the remote digital computer for turning on the light emitting diodes, initiating an image capture sequence by refreshing cells of the dynamic random access memory to a predetermined voltage, beginning image soak time, turning off the illuminating means, and transmitting image bytes from the cells of the dynamic random access memory via the cable to the remote digital computer.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DESCRIPTION OF THE INVENTION

Figure 1:
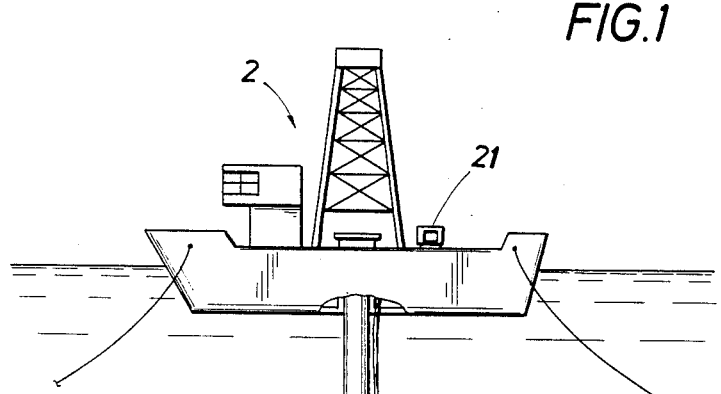
FIG. 1 is a schematic illustration of the invention placed in a preferred embodiment of position sensors for subsea ram blowout preventers and including a system for addressing and sensing the position of the rams of subsea ram blowout preventers from an offshore drilling platform.

FIG. 1 shows a preferred embodiment of the sensor and system according to the invention. In the embodiment of FIG. 1, a drilling platform 2 communicates with a blowout preventer stack 8 in which one or more ram blowout preventers 7 are stacked in conventional fashion and serve to protect the well against high pressure downhole conditions. The drilling platform 2 may be a drilling vessel or a semi-submersible vessel in which a riser 5 communicates with the blowout preventer stack and through which a drilling string extends for the drilling of the borehole 3.

The environment for the position sensors in the system may likewise be a bottom-founded rig, and the sensors and system according to the invention may be used on other apparatus during the drilling of a well such as for the sensing of a piston of an annular blowout preventer or other devices. Indeed, the invention is not limited to an oil and gas drilling environment at all, but may be used for example to sense the motion of a valve member in a nuclear reactor, where direct measurement of a movable member is not convenient or even possible.

In the environment shown in FIG. 1, a sensor 10 is provided in a spool 14 about an extension connected to a ram piston. Preferably, such a sensor is provided for each of the ram pistons of each BOP 7 for the purpose of remotely sensing the position of the piston continuously at the location of drilling platform 2. The system includes a platform disposed digital computer 21 which communicates with position sensors 10 by means of a primary cable 6 to which secondary cables 4 which are illustrated as being electrically connected in parallel, one secondary cable being provided to each of the sensors 10 for each of the ram blowout preventer pistons of stack of ram BOP's 7. A series bus cable from the primary cable 6 to each of said sensors 10 is an alternative electrical connection.

Figure 1B:
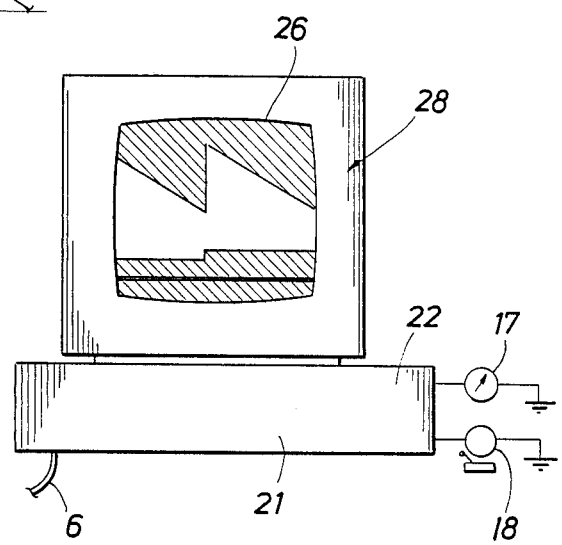
FIG. 1B illustrates a portion of the scribing marks displayed on a CRT device in response to image signals transmitted to the platform surface from the sensor mounted on the spool.
Figure 1A:
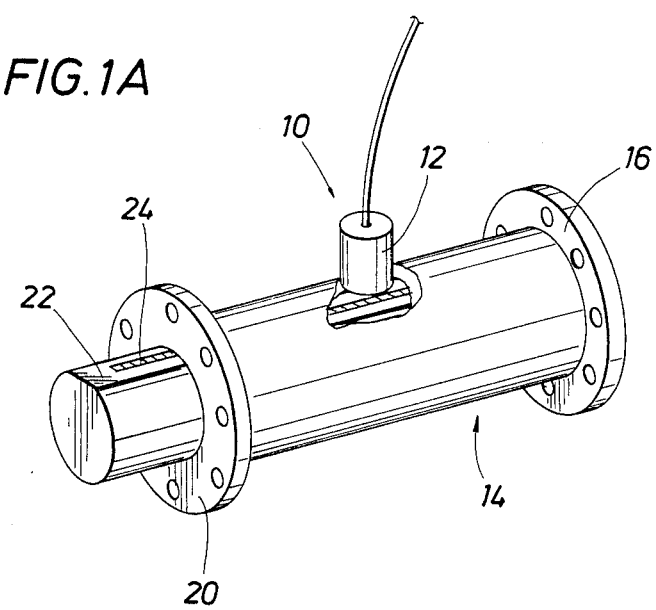
FIG. 1A illustrates in an elevational view partially cutaway, a spool attached to the housing of the ram blowout preventer through which an extension of the ram piston shaft moves and further illustrating scribing marks on a portion of the extension which move beneath a sensor mounted on a housing of the spool.

FIG. 1A illustrates in an elevational view, a spool 14 which is mounted to each of the ram BOP's 7. A piston extension 22 is attached to its respective ram BOP piston and extends through the interior of spool 14. A flange 16 is provided to connect the spool 14 about the ram piston and to the BOP 7, and a flange 20 is provided to connect a locking mechanism 13 or the like about the end of the piston extension 22. Scribing marks 24 are provided on a portion of the piston extension 22. The scribing marks are visible to the sensor 10 through a hole in the spool 14.

FIG. 1B illustrates a visual representation of the scribing marks 26 which are displayed on a CRT device 28 associated with the digital computer 21 remotely disposed on the drilling platform 2. FIG. 1B also illustrates that the computer 22 generates a position signal indicative of the position of the ram BOP piston extension and drives a position meter 17. The computer 22 also generates an alarm signal to drive an alarm 18 if the position of ram BOP extension has moved a predetermined amount.

Figure 2:
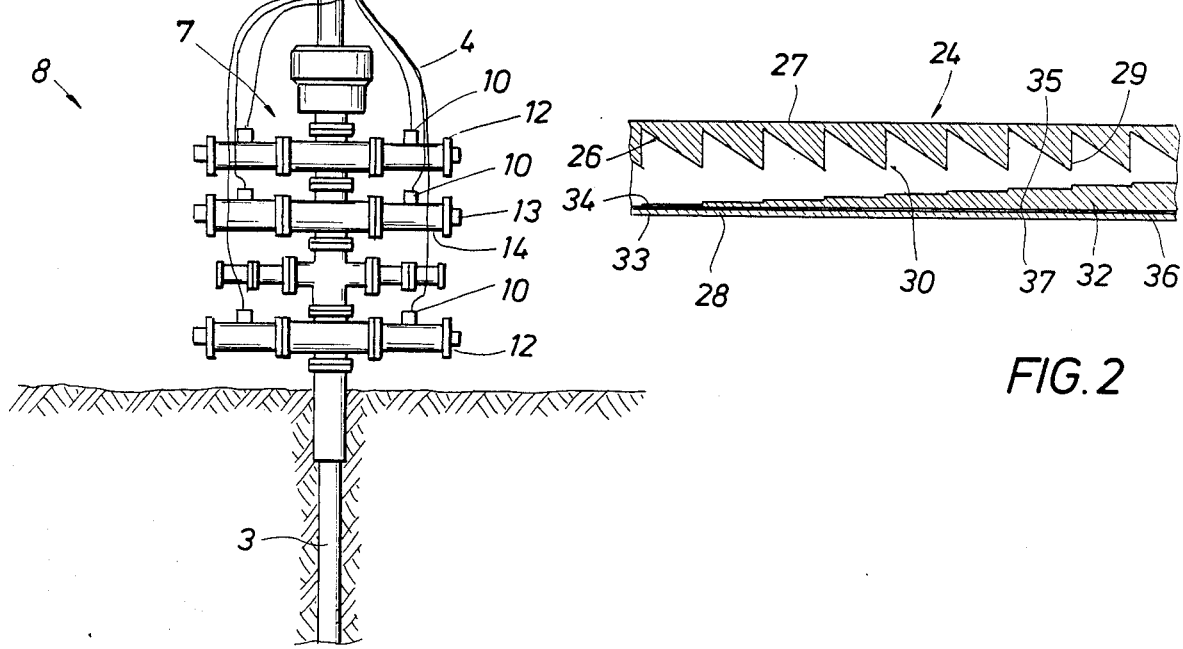
FIG. 2 illustrates the preferred scribing marks disposed on the movable member according to the invention.

FIG. 2 illustrates the preferred scribing marks to be placed on the piston extension 22. The scribing marks 24 are defined by a first area 26 which is of a first optical shade, preferably black. The upper boundary 27 of the first area 26 is a straight line while the lower boundary of the first area 26 is a saw tooth wave shape 29.

A second area 28 of the first optical shade, preferably black, has two relatively long parallel sides 33 and 34 which are disposed with respect to the upper boundary 27 of the first area 26 such that the sides 33 and 34 are parallel to the boundary 27.

A third area 32 is disposed between the first area 26 and the second area 28 and is defined by a stair-stepped wave 35, the steps of which correspond to the beginning and end of the saw teeth of the wave 29 of the first area 26. The third area is also of the first optical shade, preferably black, and the base 36 of the stair-stepped third area 32 is separated by a narrow gap 37 from the long side 34 of the second area 28. A fourth area 30 is disposed between the third area 32 and the first area 26 and is of second optical shade, preferably white.

The scribing marks of FIG. 2 are provided in connection with the system according to the invention and serve two purposes. First, the sensor 10 can only sense a portion of the scribing marks as illustrated in FIG. 1B where the image is reproduced on a surface disposed CRT device 28. A human being can look at the image on the CRT and, depending on the black and white space showing in the image, quickly determine the relative position of the piston extension 22 with respect to the sensor 10. Second, the digital computer 21 on the drilling platform 2 uniquely determines the relative amount of black and white spaces from the signal transmitted to it representative of the optical image of the piston extension scribing marks. The relative amounts of black and white space transmitted to the computer 21 is converted into a position signal representative of the numerical value of or percentage of travel of the piston extension 22. As illustrated in FIG. 1B, the position signal may be used to drive a meter 17, or compared with a threshold signal, to drive an alarm 18 if the piston extension is beyond a threshold position.

Figure 3:
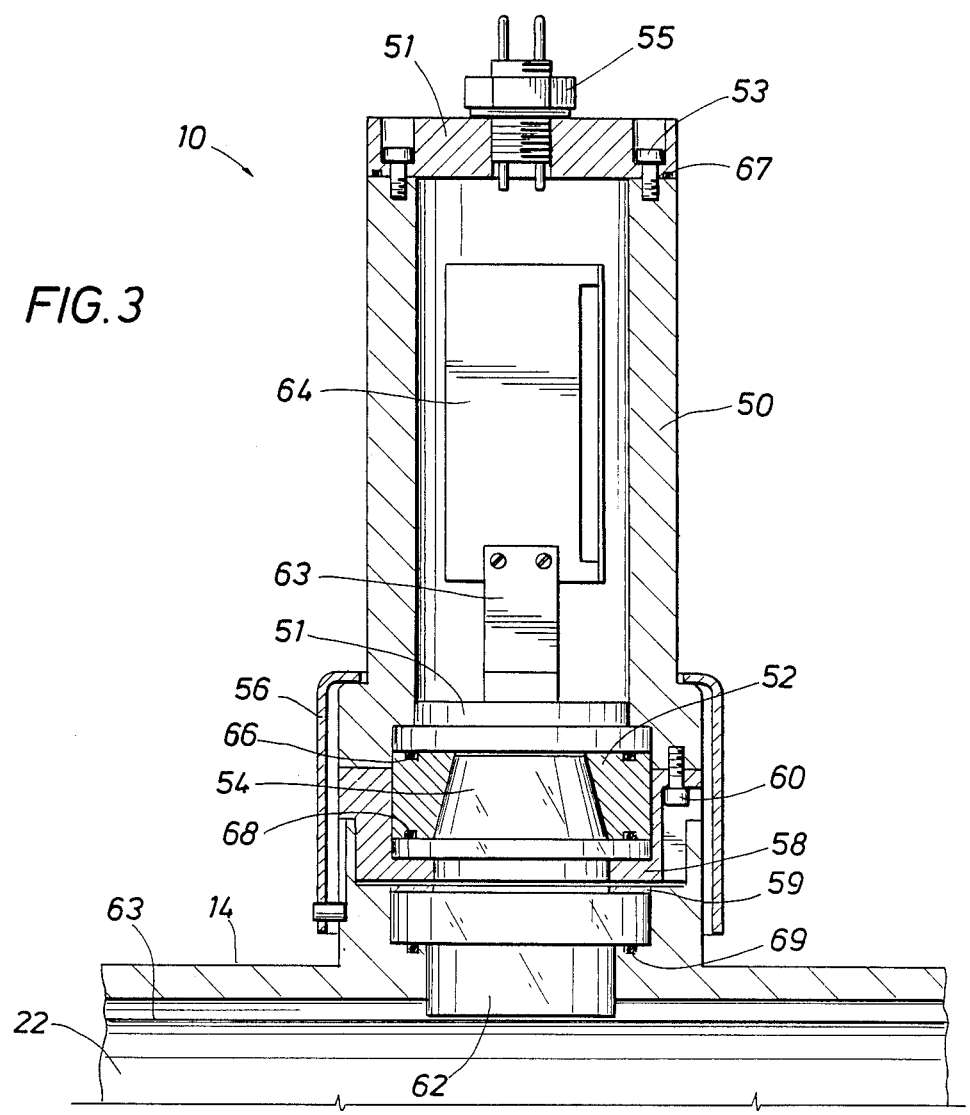
FIG. 3 is a cross-section of the sensor mounted in a housing attached to the spool and illustrating the position of the member with respect to the fixed housing.

FIG. 3 illustrates the sensor 10 and includes a pressure housing 50 removably secured to the spool 14 by means of a locking ring 56. A hole 57 in the spool 14 is filled with a socket window 62 which extends to the flat edge 63 of movable member 22. As illustrated in FIGS. 1 and 1A, the spool 14 is stationarily attached to a mechanical device such as a ram blowout preventer by means of flange 16. As FIG. 3 illustrates, the movable member 22 moves laterally with respect to the stationary socket window 62 such that the scribing marks 24 on the flat portion 63 of spool 22 are viewable through the socket window into the interior of the sensor 10.

Figure 4A:
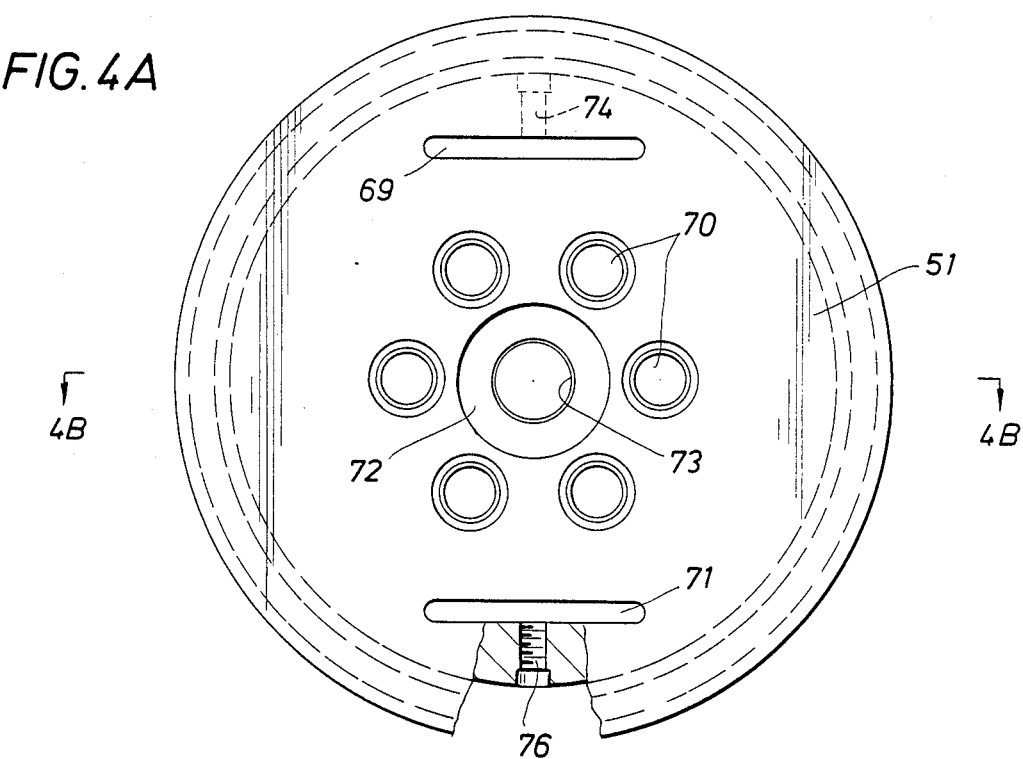
FIGS. 4A and 4B illustrate a lens board mounted within the housing for mounting light emitting diodes for illuminating the scribing marks and further illustrating a lens disposed in the lens board for focusing an image of the scribing marks onto an imaging device.
Figure 4B:
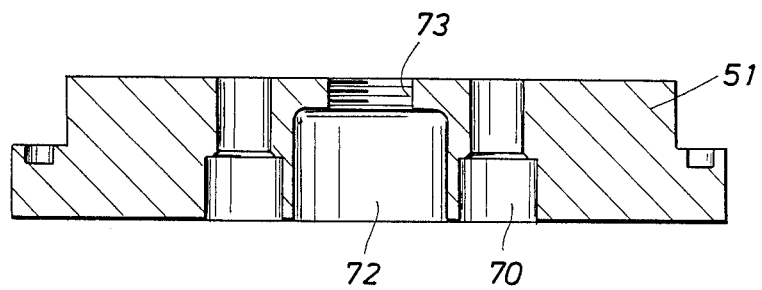

A lens board 51 is secured in the pressure housing cylinder 50 and is described in more detail with respect to FIGS. 4A and 4B. A window support ring 52 and window 54 face the side of the lens board 51 and both are secured axially to the lens board 51 by means of a window retainer 58 which is secured to the pressure housing cylinder 50 by means of screws 60. The socket window 62 and window 54 are preferably constructed of clear acrylic material. A pressure housing end cap 51 closes the other end of the pressure housing 50 and is secured thereto by means of screws 53. Sealing O-rings 67, 66, 68 and 69 operably seal the interior of the pressure housing 50 from the external environment, for example, sea water at the sea floor. A sealed electrical coupling 55 is provided in the pressure housing end cap 51 to communicate with a cable, for example secondary cable 4, as illustrated in FIG. 1. The pressure housing, sealing means and electrical coupling may be designed to withstand the pressure of deep sea water, for example 10,000 ft.

A spacer ring 59 is inserted between the socket window 62 and the window 54. When the locking ring 56 is secured to the spool 14, the spacer 59 secures the socket window 62 within the hole 57. An OpticRam support frame 63 is secured to the lens board 51 as illustrated in FIG. 4A. The support frame 63 has two parallel members 69 and 71 which extend through slots in the lens board and is secured by means of set screws 74 and 76.

Turning now to the lens board 51, FIGS. 4A and 4B illustrate its construction. Six light emitting diode sockets 70 are provided circularly about the axis of the board 51. At the center of the board is a lens aperture 72. FIG. 4B illustrates the cross-section of FIG. 4A and shows that the sockets 70 extend completely through the socket board and that a hole 73 extends completely through the board and into the lens aperture 72.

Figure 5:
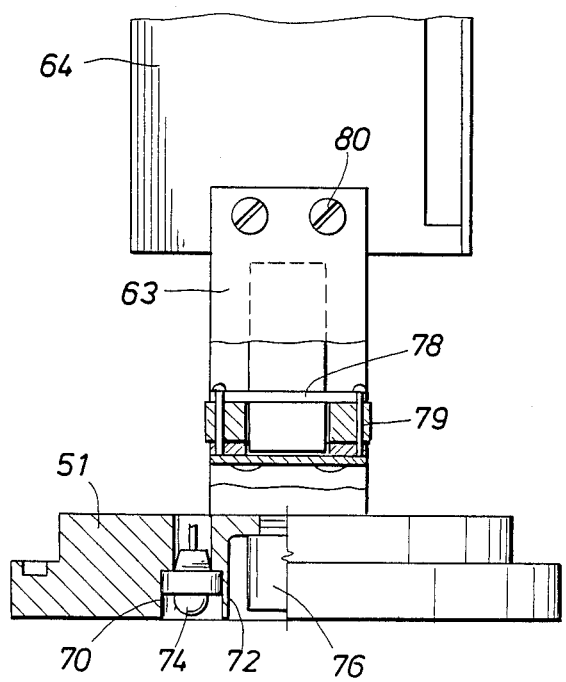
FIG. 5 shows the lens board and a mounting apparatus where the lens board is partially in cross-section and shows a light emitting diode and a lens mounted therein and further illustrates the mounting of a dynamic random access memory as an imaging device according to the invention.

FIG. 5 illustrating the lens board 51 in a cutaway portion, shows a light emitting diode 74 inserted in a socket 70. Also illustrated is the lens 76 which is inserted in the lens aperture 72. Preferably, the lens has a ten power magnification and focuses the image of the scribing marks on the moving member 22 onto the surface of the dynamic random access memory (OpticRam) 78 which is mounted by means of screws 79 to the OpticRam support frame 63.

The OpticRam 78 is an image sensor using a dynamic random access memory. In particular, the OpticRam is commercially available and denominated as the IS32 OpticRam, a product of Micron Technology, Inc. of Boise, Id. The IS32 OpticRam image sensor is a solid-state device capable of sensing an image and translating it to digital computer compatible signals.

The solid-state image sensor OpticRam uses a dynamic random access memory as a light sensitive element. The dynamic random access memory is mounted in a semi-conductor package having a transparent lid which is mounted to face lens 76, as illustrated in FIG. 5. The lens 76 focuses the image of scribing marks 24 onto the dynamic random access memory and each sensing element of the sensor may be addressed and read out to produce a digital representation of the image shown on its surface. Such a solid-state image sensor is described in U.S. Pat. No. 4,441,125 to Parkinson and is incorporated herein for all purposes.

Figure 6:
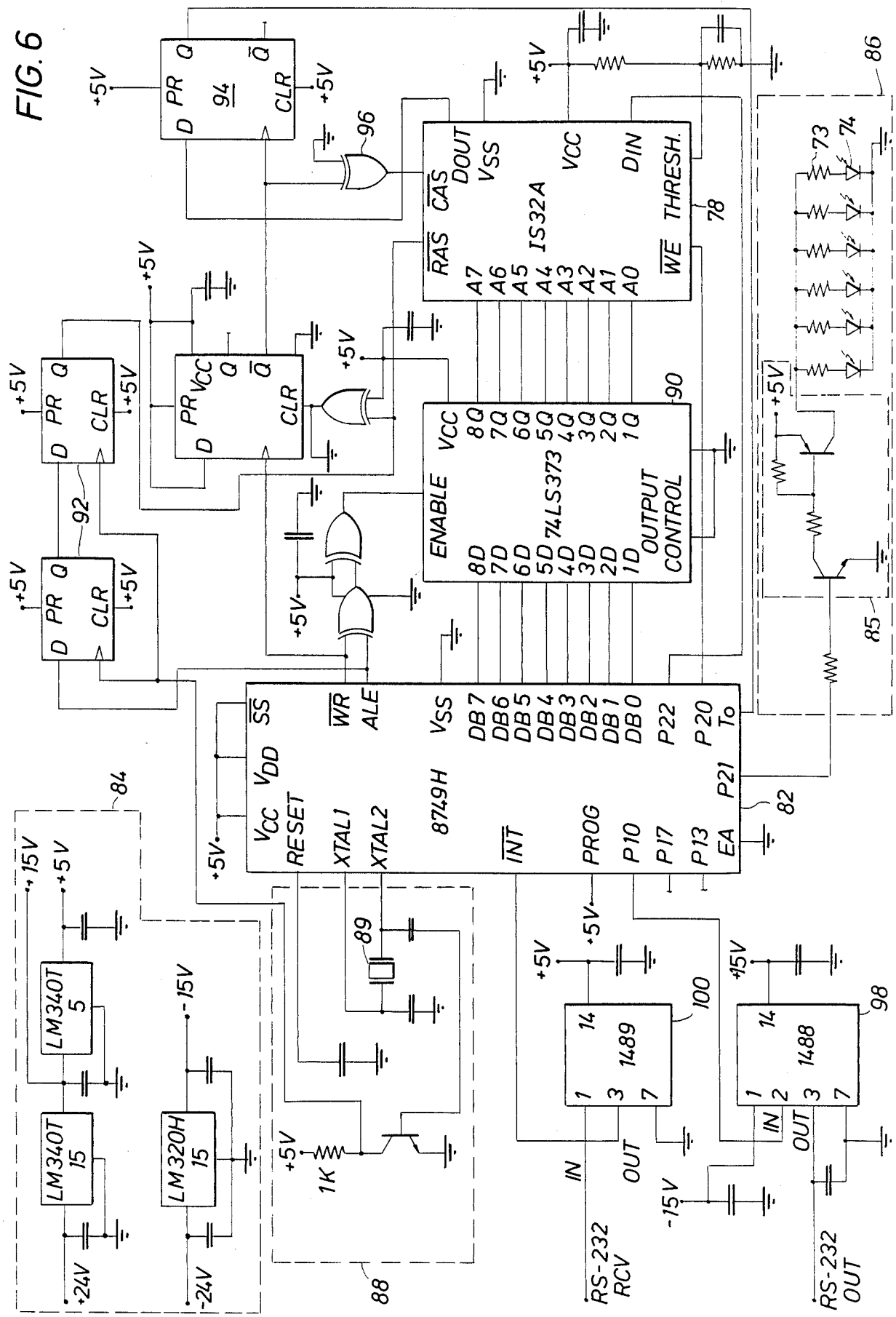
FIG. 6 illustrates the electrical circuitry of the imaging device or OpticRam and further illustrates the connections between a microprocessor and the imaging device along with a power supply and standard connections to a cable extending to a remote digital computer.

The circuit board support frame 64 which is attached by means of screws 80 to the OpticRam support frame 63 provides a support frame for the mounting of a circuit board incorporating the electronics as illustrated in FIG. 6 with, of course, the exception of the IS32A OpticRam 78 which is mounted as illustrated in FIGS. 3, 4A and 4B and 5, a frame 63. As illustrated in FIGS. 3, 4A and 4B and 5, a sensor 10 is provided in which an image sensor 78 and a lens 76 and illuminating means such as light emitting diodes 74 are provided in a sealed environment, secure from the high pressure sea water in which the sensor is to be placed.

It should be understood that other imaging technologies may be used with this invention. Charge coupled devices (CCD's) or a vidicon television camera could be used as a substitute for the IS32A OpticRam, but in the preferred embodiment of this invention, the IS32A OpticRam has advantages of low cost, small size and low power requirements compared to presently commercially available CCD and vidicon technologies.

GENERAL DESCRIPTION OF THE IS32A OPTICRAM

The memory cells of the OpticRam function as light sensitive capacitors. The cells are charged to a voltage level by writing to a cell in the normal way a DRAM (Dynamic Random Access Memory) is written to. If dynamic refresh of the OpticRam (normally required of a DRAM in a computer) is not performed, the charge on the capacitors leaks off as a function of the amount of light striking the cell. The time the cells are allowed to discharge, or "soak", corresponds to "exposure time", as in photography.

To "stop" exposure, the dynamic refresh of the OpticRam is allowed and the cells are "pulled" to either a logic high level or low level depending on the state of discharge of the capacitor cells (relative to a threshold voltage) at the time dynamic refresh began. The cells are physically arranged in a planar pattern on the OpticRam die. The cells of the OpticRam are read (as a DRAM is read) and reconstructed to form a dot-matrix image.

The number of light sensitive cells, or "pixels" needed to display an image as in FIG. 1B is relatively small (126×64 pixel array) and is available from the OpticRam. The binary image from the OpticRam (low or high state corresponds to white or black) can be transmitted a relatively long distance by the RS-232C communication standard at 9600 baud (about 1 second image transmission time).

DESCRIPTION OF SENSOR CIRCUITRY

FIG. 6 illustrates the OpticRam 78 and an Intel 8749H microprocessor 82 and associated electronics which are mounted within the pressure housing 10. The IS32A OpticRam as described above is mounted on the OpticRam support frame 63 while the microprocessor 82 and the other electronics is mounted on circuit board support frame 64. A power supply 84 is provided to receive plus and minus twenty-four volts from the electrical coupling 55 via the secondary cable 4 and the primary cable 6 from a surface supply of voltage. The power supply 84 converts the twenty-four volt supplies to plus fifteen volts, plus five volts, and minus fifteen volts to provide the necessary voltage levels for the microprocessor and the IS32A OpticRam 78 and other sensor circuitry.

The microprocessor also controls the illuminating circuit 86 which includes six light emitting diodes 74 which, as described previously, are disposed in LED sockets 70 as shown in FIGS. 4A and 5.

The microprocessor 82 is clocked at its maximum recommended frequency, 11 MHZ. The oscillator 88 includes driver circuits, external capacitors and a piezoelectric crystal 89.

The 8749H microprocessor 82 provides row and column addresses for the IS32A OpticRam 78 via its 8-bit data bus (DB0 . . . DB7). A signal, "ENABLE", is derived from the 8749H 82 WR and ALE lines that clocks a 74LSZ373 transparent octal latch 90. The latch 90 is used to extend the hold time on the microcomputer data used as the OpticRam column address input.

A transistor driver attached to the XTAL2 leg of the 8749H and a pair of 74LS74 D flip-flops 92 create a delayed version of the 8749H ALE signal. This signal is used as the RAS (row address strobe) for the OpticRam 78. The CAS (column address strobe) signal of the OpticRam is derived from the delayed ALE signal and the 8749H 82 WR signal.

A flip-flop 94 is used to clock in OpticRam D out data (image bit) and to transfer the data onto the 8749H 82 $T_o$ pin where it is read. The XOR gate 96 buffer between this flip-flop's clock input and the OpticRam CAS input serves to effectively increase the hold time of OpticRam 82 data to the flip-flop 94.

The transistor driver circuit 85 for the LED illuminating circuit 86 provides current for the LEDs 74. Current limiting resistors 73 are placed in series with the LEDs 74. A short circuit failure of an LED will thus not result in failure of the entire lighting circuit.

The 1488 driver 98 and 1489 receiver 100 chips are used to interface the microprocessor 82 to external RS-232C data signals. The RS-232C interfaces are standard coupling interfaces.

Bypass capacitors are attached to the supply line of each integrated circuit. A capacitor is attached to the 8749H 82 RESET line to provide a RESET hold-off time as the power supply stabilizes. A capacitor is attached to the RS-232C output line to define the slew rate of that output. Various other capacitors are used in the circuit to filter electrical noise.

DESCRIPTION OF SURFACE COMPUTER/SENSOR INTERACTION

A remote computer or central processing unit (CPU) communicates with at least one but more likely a plurality of sensors as illustrated schematically in FIG. 1. In the preferred embodiment of this invention, 32 sensors or "cameras" may be arranged along a common RS-232C link to the host CPU, but only one camera can respond to CPU commands at a time. Each camera is assigned an address, entered by jumpers or a dip switch on the camera printed circuit board (PCB), which uniquely identifies it to the host CPU. A Zenith Z-100 microcomputer has been used as the remote computer (CPU), but other general purpose CPUs may be used by one of ordinary skill in the art of computer technology.

Figure 7A:
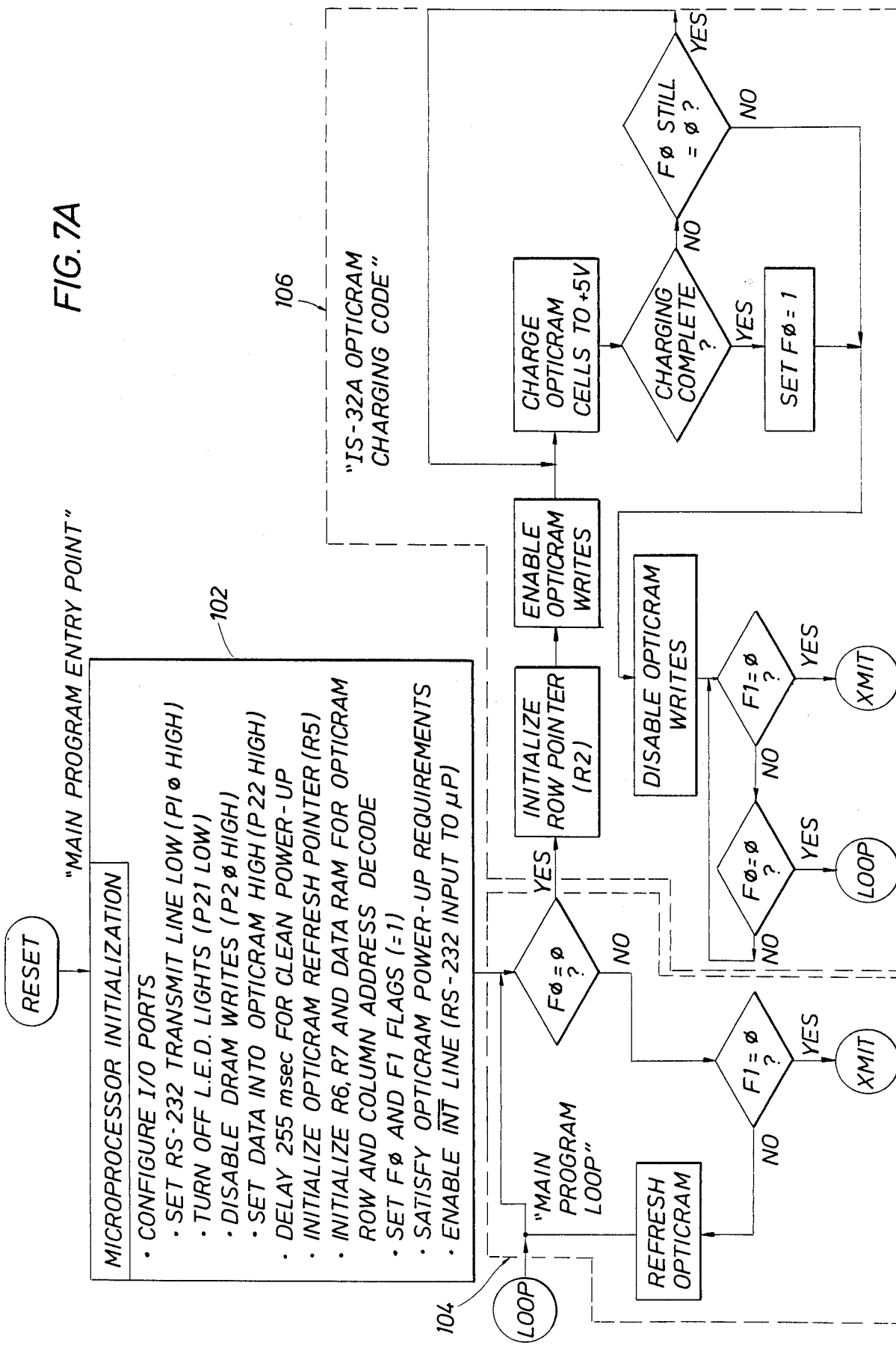
FIGS. 7A, 7B and 7C present a flow chart illustrating the logic incorporated by means of program statements in the microprocessor used in response to command and address signals from a remote digital computer to turn on the illuminating means, to initiate an image capture sequence of the dynamic random access memory, to begin an image soak time, to turn off the illuminating means, and to transmit image bytes from the cells of the dynamic random access memory via the cable to the remote digital computer.
Figure 7B:
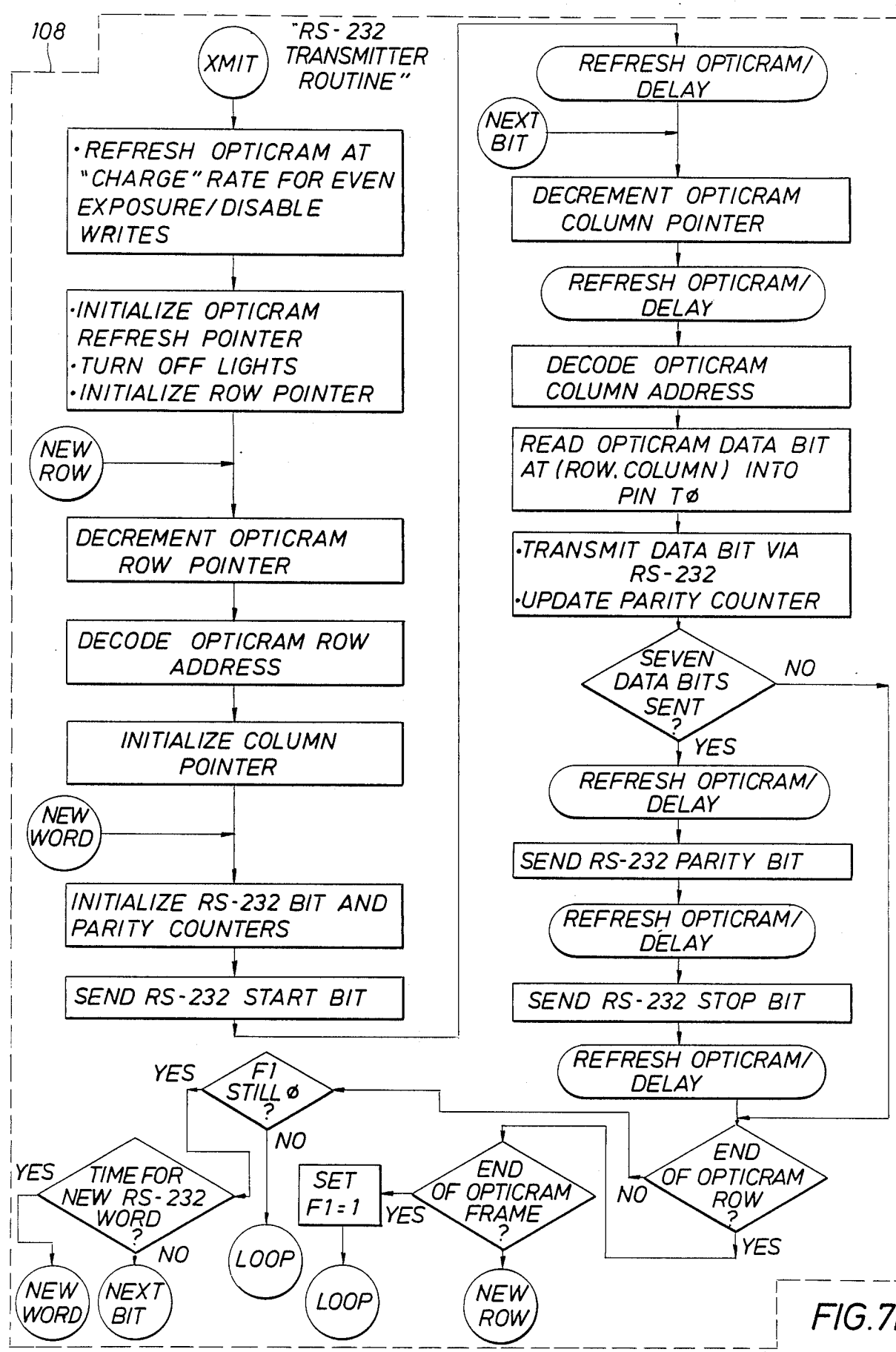
Figure 7C:
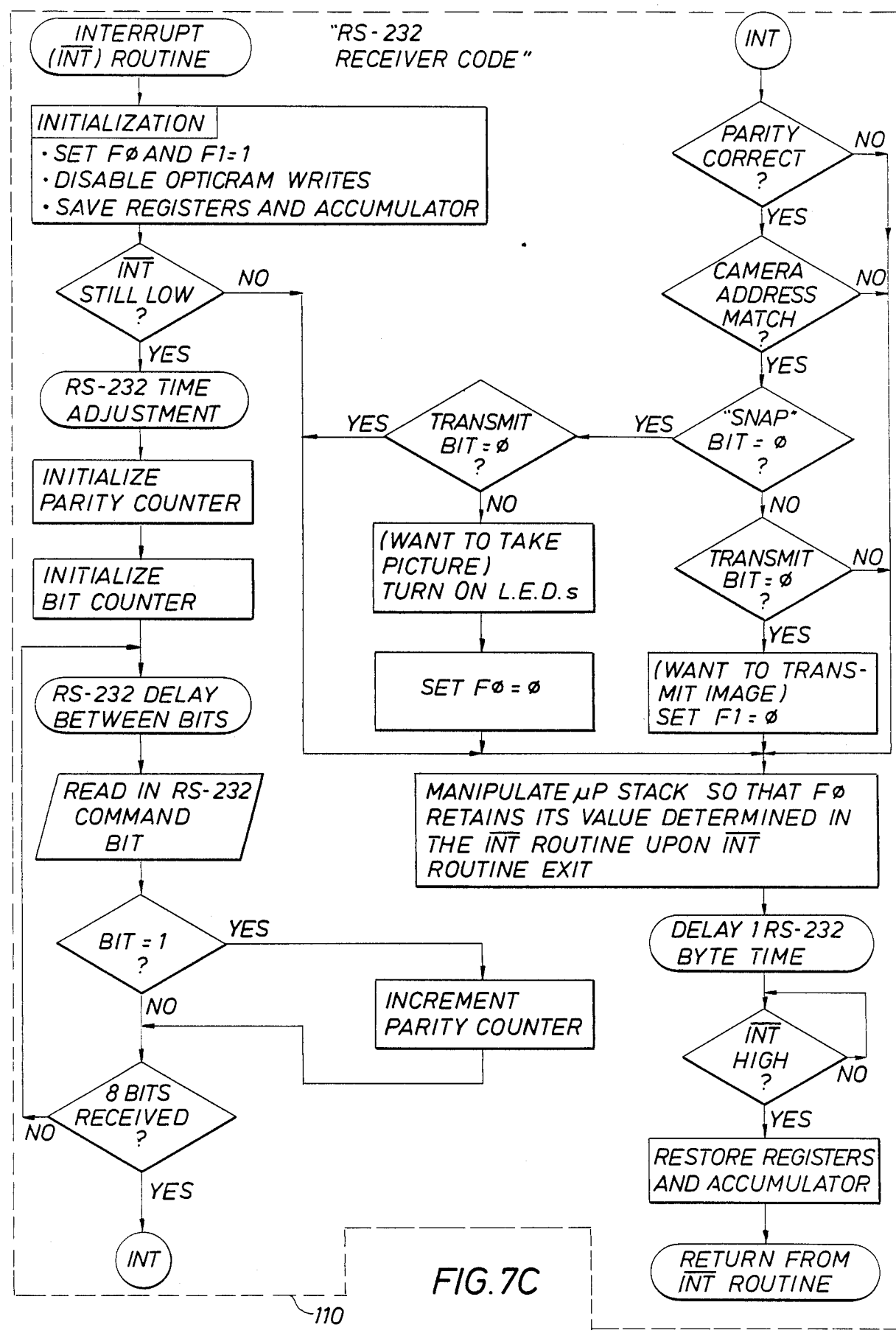

The image capture sequence of a sensor under control of a remote CPU is summarized by the following steps:
1. CPU sends next sensor address and activate command.
2. Sensor recognizes address and activate command consisting of:
   a. set bit to turn on lights
   b. set bit to initiate capture sequence consisting of:
      i. charge IS-32 cells to +5 V
      ii. begin soak time
3. Software at the CPU determines soak time delay and goes into timing loop and simultaneously opens RS232 port to accept image from sensor.
4. At the end of the soak time timing loop, CPU sends sensor address and image transmit command to sensor.
5. Sensor recognizes address, and does the following:
   a. sets bit to turn off lights, and
   b. transmits image bytes to CPU.
6. CPU receives image bytes into memory, each image requiring 1152 bytes, including parity bits.
7. CPU counts the bytes as they are received to determine when transmission is complete.
8. CPU stores image on disk.
9. CPU displays image on screen.
10. Process returns to step 1 and repeats. Sensor (Camera) Flowchart Description FIGS. 7A, 7B and 7C present a flowchart of the sensor's (camera's) microcomputer software logic. A description of the general operation of the 8749H microprocessor is included in the "1984 Intel Microcontroller Handbook", a publication of the Intel Corporation.

The flowchart is written at a middle-level of complexity, that is, including process steps, such as "REFRESH OPTICRAM", and does not account for each assembly code instruction needed to refresh the OpticRam. But sufficient information is given to identify all key events in the microprocessor logic at a fairly low level. Major camera software routines are identified within quotation marks on the flowchart. The flowchart entries correspond to distinctly separated and identified blocks of code in the Assembly listing included in Table 1 below. Descriptive comments of each block follows.

A. Main Program Entry Point

Upon manual or power-up RESET of the microprocessor, the main program entry point code 102 is executed. Input/output (I/O) lines of the microcomputer are software configured as inputs or outputs. These are binary logic lines: inputs detect voltage levels as high or low and outputs generate signals which are detected as high or low voltage levels by other compatible devices. I/O lines are used to turn LEDs on and off, to provide OpticRam timing signals, to send and receive RS-232C communication signals, and to read the unique address of the camera itself. Registers R6, R7 are special random access memory (RAM) locations for holding data that is frequently accessed or modified.

Registers (designated by R0, R1, R2, etc.) are used to hold row and column addresses for accessing the OpticRam, as counters for effecting delays and monitoring events, and as memory to hold often used constants and as temporary storage locations.

The accumulator is a special register that can be used with arithmetic instructions and whose operations may effect condition code "flags" to indicate arithmetic events such as carry generation and overflow and underflow of the processors (8 bit) arithmetic precision. It must be used when data is to be moved from or to registers and other memory. Other special "flags" are designated F0 and F1 and are used to indicate whether the processor is to take steps to acquire an image, to transmit the image via RS-232C from the OpticRam or to simply refresh the OpticRam continually to maintain the last image recorded in the OpticRam.

The INT line is a microprocessor interrupt line. A logic low level on this line causes the microprocessor to stop execution after the current instruction and begin performing the "interrupt routine". The interrupt routine for the sensor is the code that receives the RS-232C commands from the remote CPU. The INT line has special microprocessor functions that can be used to check its state (high or low). A command coming over the RS-232C line is immediately recognized, and being responsive to the host computer or CPU for commands takes the highest priority for the microprocessor.

The microprocessor Initialization 102 sets registers, data RAM, I/O lines, and flags to desired states immediately as the processor begins functioning from a power up or manual RESET of the microprocessor. The RS-232C transmit line is set low (by I/O line P10, see FIG. 6, microprocessor 82) which is the state of the line when not transmitting. I/O line P21 is set low to turn off the LEDs. I/O line P20 is set high to prevent data in the OpticRam from being written over. The configuration of I/O Port 2 causes I/O line P22 to go high which will be used for charging OpticRam cells to +5 volts. The microprocessor 82 then delays for about 255 msec to allow the oscillator 88 to further stabilize and for voltage to other electronic components to reach proper operational limits before any other steps are taken.

Only even OpticRam rows from 0 to 126 and even columns from 0 to 252 are used for the sensor or "camera". A microprocessor write to any column in a particular row refreshes the data in all columns of that row. The range of rows of the OpticRam device actually extends from 0 to 255 so that the refresh row pointer register is initialized to be within the proper range. Memory cells of the OpticRam are not physically organized in neat rows. Routines "ROWDEC" and "COLDEC" from the assembler listing (see the Table 1 below at the end of this specification) unscramble or decode row and column addresses so that the proper cell may be accessed. Data stored in certain data RAM locations and R6 and R7 are used in the decoding function and so these locations are initialized to the proper values.

Flags F0 and F1 are set to 1 (logic "high") to prevent unordered image acquisition which might cause an unwanted transmission or to leave the LEDs on indefinitely.

To satisfy an OpticRam power-up specification, eight write cycles to the OpticRam are performed. Finally, the INT line is enabled in software to allow acknowledgement of RS-232C host CPU commands.

B. Main Program Loop

The microprocessor is normally in the loop 104, "main program loop". This is a tight programming loop which checks to see if "snap" (F0=0 acquire an image) or "transmit" (F1=0 transmit the image) commands have been received. Refresh of the OpticRam is continually performed, once per loop, to maintain the image which was least acquired. Hence, the "transmit" command can be used any number of times to recall the same image. The Main Program Loop routes logic control to the "IS-32A OpticRam Charging Code" 106 if F0=0 or to the "RS-232C Transmitter Routine" 108 if F1=0.

C. IS32A OpticRam Charging Code 106

To begin an image acquisition cycle ("snap"), the OpticRam cells must be charged to +5 volts. This is done by writing a logic 1 into Din of the OpticRam at each cell address for the rows that are used. A logic 0 is used for rows 128 through 255. Din is set high during microprocessor initialization (P22 is high). The 37 write enable" (WE) of the OpticRam is pulled low to allow writes to take place. An 8749H command, "MOVX", is used to set up the proper row and column addresses for each cell and to generate the proper RAS and CAS timing that the OpticRam needs to "write" the logic 1 to each cell. During this charging cycle, the flag F0 is monitored to make sure another command has not been received to cancel the current command.

Upon completion of the charge cycle, OpticRam writes are disabled and the F0 flag is reset to 1 to prevent an unwanted exposure cycle. A tight loop is then entered to prevent refresh of the OpticRam during the exposure time. Note that the LEDs are turned on in the "RS-232C Receiver Code" routine 110 when a "snap" command is received so that lighting is present during the exposure time. The loop is exited when either another "snap" command or a "transmit" command is received.

The time to charge the individual cells in the array is about 189 msec which is thus the approximate minimum exposure time for the camera. A shorter time will yield an erroneous image, i.e., an incomplete exposure.

D. RS-232C Transmitter Routine 108

The Transmitter routine 108 reads image data from the OpticRam and transmits it serially to the remote CPU by the RS-232C protocol. The first thing the Transmitter routine does is bring the exposure cycle to a "clean" conclusion. Since some exposure times may be very short (close to 189 msec, the minimum exposure time), the rows of OpticRam cells are refreshed at the same rate as they were written (or "charged") to maintain an even exposure time over the array. The rows are refreshed in the order they were charged because a complete row can only be refreshed, not an individual cell. A delay is provided between refreshing rows at the rate that rows were charged. The error in exposure from one end of a column to the next is quite small.

After the dedicated OpticRam refresh is complete, writes to the OpticRam are disabled to prevent destroying the image by an unintended write cycle. The OpticRam refresh address pointer is initialized to begin refresh at the end of the array that has gone the longest without refresh. The LEDs are turned off because the exposure is complete. The OpticRam row pointer is initialized to the row that contains the first line of the image.

The OpticRam data transmission then begins. An RS-232C data word is a string of low-to-high pulses on the actual conductor cable. The basic unit of time for transmitting a bit of information is called a "bit time" and equals the inverse of the "baud" rate. A baud rate of 9600 is chosen. This translates to an image transmission time of about one second which is sufficiently fast for the preferred embodiment of a remote sensing BOP piston system.

Seven data bits are sent per each word. An "even" parity bit is sent following the data bits. The parity bit has a value equal to the binary value (0 or 1) required to make the sum of data bit values (0s or 1s) equal to an even number. The parity bit is used to detect some types of transmission errors.

The data word transmission begins with a "start bit" which is a high level on the RS-232C conductor for one bit time beginning from a low level. The data or "image" bits follow, each being one bit time in duration, where a logic 0 read from the OpticRam (a "white" pixel) is transmitted as a high voltage and a logic 1 (a "black" pixel) is transmitted as a low voltage level.

Following the data bits, the RS-232C line voltage is returned to the low state (if it was not already low from the 7th data bit). A delay of bit times, called "stop bit", is effected to space the RS-232C data words. Approximately one and a half stop bits are used. Therefore, each word of seven data bits that is sent takes about $1+7+1+1.5=10.5$ bit times. A total of $64\times 126$ image bits is sent so that transmission time is about:

$$\frac{(64 \times 126)}{10.5} \cdot \frac{1}{9600} = 1.26 \text{ sec.}$$

Since there are 126 columns and there are seven image bits per RS-232C word, there are 18 $(126 \div 7 = 18)$ RS-232C words per row of OpticRam cells. The rows are traversed, column-by-column, until the end of a row is detected. At the end of a row, a check is made to see if there are more rows to send. Between each RS-232C word, a check is made to see if the flag F1 has been changed by a command on the RS-232C INT line. The transmission ceases if F1 was changed to a 1. A count of data bits sent, in the current RS-232C word, is kept. When seven image bits have been sent, the parity and stop bits are sent. As a data bit is read, it is checked to see if it is a 1. If so, the carry bit of the microprocessor (initialized to 0) is complemented (if 0, make 1, if 1, make 0). In this way parity is updated. When it is time to send the parity bit, the opposite state of the carry bit is sent which is the even parity for that image word. A data bit is read by performing a microprocessor "MOVX @R0,A" instruction. This sets up the OpticRam row and column address and the RAS and CAS and other timing signals that clock data out of the OpticRam and to a flip-flop whose data out (Q) pin is attached to the microprocessor $T_o$ pin. The microprocessor 82 (FIG. 6) has a special instruction to check the state of $T_o$.

Image words are continuously sent in this fashion until the end of the image frame (end of last rww) is detected. When this occurs, F1 is set to 1 to stop further transmission. The "Main Program Loop" 104 is then re-entered. "Refresh Optic Ram/Delay" blocks are scattered throughout the Transmit procedure. These are microprocessor delays to provide the proper bit time duration of RS-232C start, data, parity, and stop bits. The execution time of microprocessor commands is known as a function of the clock frequency, thus the timing is precisely predictable. Where these delays permit, refresh of the OpticRam occurs between the bits to preserve the image during transmission. It should be realized that apparently unncessary commands exist in the microcomputer code which serve to keep timing paths throughout the Transmitter and Receiver code equal.

E. RS-232C Receiver Code 110

The Receiver Code 110 reads in RS-232C command words from the host computer. All sensors or "cameras" on a common RS-232C receive line receive the commands.

The actual RS-232C receive line conductor is normally at a low voltage state, which appears as a high state on the INT line. As the command word begins, a low level on INT is detected and the Interrupt Handling Routine is entered. F0 and F1 are set to their inactive states (1) and may be modified by the command word received. OpticRam writes are disabled and the register and accumulator values are saved. There are two register "banks" of eight registers each on the 8749AH microprocessor 82. These banks are software selectable and contain unique RAM locations for the registers. The registers from outside the RS-232C Receiver Code are saved by switching register banks. The accumulator is saved at one of the new registers not needed in the Receiver routine. These values are saved so that processing will continue from where it was interrupted with the same registers and accumulator values when the Interrupt routine is exited. This is especially important to maintain the proper order of the OpticRam refresh.

The RS-232C command word is received with the same format as data words are sent. After the interrupt is detected, the INT line is checked to see if it is still low. If not, there must have been response to a "noise" spike on the receiver line, so the receiver code is exited. Assuming the line is still low (the start bit is still in progress), the command word is read. The highest order bit of the accumulator is initialized to a 1, all other bits being zero. When it is time to read a bit, the state of the INT line is shifted into the accumulator from the left. If the data was a 1, a register (which was initialized to zero) is incremented to keep track of parity. The accumulator is initialized to zero at the beginning of the reception and the carry bit is cleared (set to 0). The accumulator shift operation causes the lowest bit of the accumulator to be "pushed" into the carry bit. As soon as the carry bit to be set is detected after a shift operation, it is known that 7 data bits have been received (since the highest bit of the 8 bit accumulator was initialized to 1). After all bits are read, the parity bit is read.

The five bits to the right of the most significant bit of the accumulator are the camera address bits. They are compared with the switch settings for that particular camera. If a parity error occurred or the camera address does not match, the Receiver code 110 is exited and no action on the command taken.

The least significant bit of the accumulator is the "snap" bit and the next higher bit is the "transmit" bit. If the transmit bit alone is set to 0, F1 is set to 0 to indicate that the host CPU has requested an image transmission. If the snap bit alone is set to 0, the LEDs are turned on and F0 is set to 0 to indicate image acquisition is requested. If both bits (snap and transmit) have the same value, no action is taken.

All program paths that exit the Receiver code must pass through code that properly restores the processor for exit from the Receiver routine. The 8749H automatically restores F0 to its state outside the interrupt routine. It is desired that this not happen because F0 has been set as desired for exit from the Receiver code. The state of F0, the interrupt return address, and other data is stored in a specially assigned RAM known as the "stack". The location of the RAM for F0 is known and it is set as desired before the Receiver routine is exited. A delay of about one RS-232C byte (word) time is effected and then INT is continuously checked until it is low. These measures are taken to assure the microcomputer will not re-enter the Receiver code 110 in the middle of a command word or after responding to noise. Finally, the accumulator is restored and register banks are switched to effectively restore register values to those at entrance to the Receiver code.

ASSEMBLY LANGUAGE LISTING CORRESPONDING TO FIG. 7

The assembly language listing for the 8749H microprocessor 82 (FIG. 6) corresponding to the flow chart of FIG. 7 is presented below in Table 1. An 8048 assembler was used to generate the code.

The listing includes 7 columns of data. From left to right:
1. Location—relative location of microprocessor code in program memory.
2. Object Code—the object code conversion of the assembly code (in hexadecimal).
3. Line—an assembly listing reference line (for referencing assembly errors, etc.)
4. Source Code—contains (left to right)
   (a) Label—a label assuming the address of "Location";
   (b) Op. Code—the operation code or microprocessor instruction;
   (c) Operand—data required by the op. code;
   (d) Comment—a brief comment which begins with a ";" to describe the assembly code.

Major blocks of code are preceded by headings encircled by asterisks. All but the "Macro Listings" and "Flag Usage" blocks are described above in the description of the flowchart of FIG. 7. "Macros" are blocks of code that only have to be entered once when forming the assembly "source" code. Once defined, a macro is simply inserted by using the macro's label ("REFRESH", "ROWDEC", "COLDEC") in the assembly source code. The OpticRam refresh code and the row and column decode instructions appear as macros since they are often used. The "Flag Usage" block describes how the flags, F0 and F1, and the register are used and what bits of the RS-232C command word represent.

What is claimed is:

1. An indicator system for remotely sensing the relative position of a moving member to that of a mechanical apparatus of which it is a part comprising,
   scribing marks disposed on a portion of said moving member,
   means for illuminating said scribing marks,
   optical sensing means for generating a digital signal representation of at least a portion of said scribing marks on said moving member,
   mounting means fastened to said mechanical apparatus for stationarily mounting said illuminating means and said optical sensing means to face said scribing marks of said moving member,
   transmission means provided between said optical sensing means and said illuminating means and a location remote from said mechanical apparatus for transmitting said digital signal representation to said remote location,
   digital computer means disposed at said remote location for generating and applying command signals via said transmission means to said illuminating means and to said optical sensing means and responsive to said digital signal representation via said transmission means for generating an output signal representation of said scribing marks, and
   means responsive to said output signal representation for displaying a visual representation of at least a portion of said scribing marks, said visual representation of said scribing marks enabling a human being at said remote location to determine said relative position of said moving member with respect to said mechanical apparatus.

2. The system of claim 1 wherein said optical sensing means includes,
   a dynamic random access memory mounted in a semiconductor package having a transparent lid, and
   at least one lens means for focusing an image of said scribing marks onto said random access memory.

3. The system of claim 2 wherein
   said illuminating means includes at least one light source, and
   said mounting means includes a lens board in which said light source and said lens means are mounted.

4. The system of claim 3 wherein
   said illuminating means includes six light emitting diodes mounted in said lens board and disposed circularly about a central aperture in said lens board, and
   said lens means includes a lens mounted in said central aperture.

5. The system of claim 2 wherein said scribing marks comprise, a first area of a first optical shade, said first area having a straight line first boundary and a sawtooth wave second boundary, a second area of said first optical shade, said second area having at least one side which is parallel to said straight line first boundary of said first area, a third area of said first optical shade defining a stair-stepped area having a lower-most step and a plurality of succeeding steps, said lower-most step being aligned with the beginning of one of the sawteeth of said second boundary of said first area, each of said succeeding steps of said third area being aligned with a corresponding succeeding tooth of said first area second boundary, a base of said stair-stepped area being parallel to but separated by a gap of a second optical shade to a parallel side of said second area, the area between the sawtooth wave second boundary of said first area and said stair steps of said third area defining a fourth area of said second optical shade.

6. The system of claim 5 wherein, said first optical shade is black, and said second optical shade is white.

7. The system of claim 2 wherein said optical sensing means further includes, programmed microprocessor means responsive to said command signals from said remote digital computer means via said transmission means for, turning on said illuminating means, initiating an image capture sequence by refreshing cells of said dynamic random access memory to a predetermined voltage, beginning image soak time, turning off said illuminating means, and transmitting image bytes from said cells of said dynamic random access memory via said transmission means to said remote digital computer mean.

8. The system of claim 1 wherein said mounting means includes, a spool stationarily fastened to said mechanical apparatus, said moving member operably extending into the interior of said spool and being moveable therein, a hole in said spool through which said scribing marks on said moving member are visible, and a housing, removably secured to said spool about said hole, said illuminating means and said optical sensing means disposed in said housing to face said hole in said spool to view said scribing marks of said moving member.

9. The system of claim 8 wherein said mechanical apparatus is a ram blowout preventer, said moving member is an extension of a piston shaft of the ram blowout preventer, said scribing marks are disposed on said extension of said ram shaft, said spool is attached to the body of said ram blowout preventer, said ram shaft is free to translate within said spool, and said scribing marks are visible through said hole in said spool.

10. The system of claim 9 wherein said housing includes sealing means for sealing the interior of said housing from subsea water pressure, and connector means for connecting an electrical cable external to said housing to electrical leads of said optical sensing means and said illuminating means inside said housing.

11. The system of claim 10 wherein, a lens board is disposed within said housing, to face said hole in said spool, said illuminating means includes six light emitting diodes securely disposed circularly about a central aperture in said lens board.

12. The system of claim 11 wherein said optical sensing means includes a dynamic random access memory mounted in a semiconductor package having a transparent lid which faces said central aperture of said lens board, and lens means disposed in said central aperture of said lens board for focusing a light image from said scribing marks on said movable member via said spool hole onto said dynamic random access memory.

13. The system of claim 1 further including, means responsive to said output signal representation of said scribing marks for producing a position signal indicative of the position of said moving member.

14. The system of claim 13 further including a meter responsive to said position signal for displaying an indication of the position of said moving member.

15. The system of claim 13 further including means responsive to said position signal for generating an alarm indicating that the position of said moving member is beyond a predetermined amount.

16. An indicator system for remotely sensing the relative position of individual moving members each of which is part of a plurality of subsea stationary mechanical devices comprising, apparatus for each mechanical device having, scribing marks disposed on a portion of its moving member, means for illuminating said scribing marks, optical sensing means for generating a digital signal representation of said scribing marks on said moving member, and mounting means removably fastened to the mechanical device for stationarily mounting said illuminating means and said optical sensing means to face said scribing marks of said moving member, digital computer means disposed on an offshore platform for generating command signals to each of said optical sensing means and said illuminating means and for receiving a digital signal representation of said scribing marks from each of said mechanical devices, means responsive to said digital computer means for displaying a visual replication of any one of said scribing marks of said mechanical devices, and cable means provided between said platform disposed digital computer means and each of said mechanical devices for electrically connecting said digital computer means with each of the illuminating means and the optical sensing means of the mechanical devices, whereby a human being at said offshore platform may visually inspect any one of said visual replications of said scribing marks to determine a relative position of said moving member with respect to its respective stationary mechanical device.

17. The system of claim 16 wherein each of said optical sensing means includes,
a dynamic random access memory mounted in a semiconductor package having a transparent lid, and
at least one lens means for focusing a light image of said scribing marks illuminated by said illuminating means onto said random access memory.

18. The system of claim 17 wherein,
each mounting means includes,
a spool stationarily fastened to said mechanical device, said moving member operably extending into the interior of said spool and being moveable therein,
a hole in said spool through which said scribing marks on said moving member are visible, and
a housing, removably secured to said spool about said hole, said illuminating means and said optical sensing means disposed in said housing to face said hole in said spool to view said scribing marks of said moving member.

19. The system of claim 18 wherein,
each mechanical device is a ram blowout preventer,
said moving member is an extension of a ram shaft of said ram blowout preventer,
said scribing marks are disposed on said extension of said ram shaft,
said spool is attached to said ram blowout preventer,
said ram shaft is free to translate within said spool, and
said scribing marks are visible through said hole in said spool.

20. The system of claim 19 wherein each of said housings includes,
sealing means for sealing the interior of said housing from subsea water pressure, and
sealed connector means for connecting one of said secondary cables to said optical sensing means and said illuminating means inside said housing.

21. The system of claim 20 wherein,
a lens board is disposed within said housing to face said hole in said spool, and
said illuminating means includes six light emitting diodes securedly disposed circularly about a central aperture in said lens board.

22. The system of claim 18 wherein,
said dynamic random access memory is mounted in said housing where said transparent lid of said memory faces said central aperture of said lens board, and
lens means is disposed in said central aperture of said lens board for focusing an image from said scribing marks on said moving member via said spool hole onto said dynamic random access memory.

23. The system of claim 16 wherein said digital computer means is additionally for producing a position signal indicative of the position of each of said moving members in response to said digital signal representation of said scribing marks from each of said mechanical devices.

24. The system of claim 23 further including a meter responsive to said position signal for displaying an indication of the position of said moving member.

25. The system of claim 24 further including means responsive to said position signal for generating an alarm indicating that the position of said moving member is beyond a predetermined amount.

26. A position sensor for a moving member which is part of a mechanical device comprising,
scribing marks disposed on a portion of the moving member,
means for illuminating said scribing marks,
optical sensing means for generating an electrical signal representation of said scribing marks on said moving member,
mounting means removably fastened to the mechanical device for stationarily mounting said illuminating means and said optical sensing means to face said scribing marks of said moving member, and
electrical connector means for connecting said illuminating means and said optical sensing means to a remote digital computer.

27. The sensor of claim 26 wherein said optical sensing means includes,
a dynamic random access memory mounted in a semiconductor package having a transparent lid, and
at least one lens means for focusing a light image of said scribing marks illuminated by said illuminating means onto said random access memory.

28. The sensor of claim 27 wherein
said illuminating means includes at least one light source, and
said mounting means includes a lens board in which said light source and said lens means are secured.

29. The sensor of claim 28 wherein
said illuminating means includes six light emitting diodes secured in said lens board and disposed circularly about a central aperture in said lens board, and
said lens means includes a lens disposed in said central aperture.

30. The sensor of claim 27 wherein said scribing marks comprise,
a first area of a first optical shade, said first area having a straight line first boundary and a sawtooth wave second boundary,
a second area of said first optical shade, said second area having at least one side which is parallel to said straight line first boundary of said first area,
a third area of said first optical shade defining a stair-stepped area having a lower-most step and a plurality of succeeding steps, said lower-most step being aligned with the beginning of one of the sawteeth of said second boundary of said first area, each of said succeeding steps of said third area being aligned with a corresponding succeeding tooth of said first area second boundary,
a base of said stair-stepped area being parallel to but separated by a gap of a second optical shade to a parallel side of said second area,
the area between the sawtooth wave second boundary of said first area and said stair steps of said third area defining a fourth area of said second optical shade.

31. The sensor of claim 30 wherein,
said first optical shade is black, and said second optical shade is white.

32. The sensor of claim 26 wherein said mounting means includes,
a spool stationarily fastened to said mechanical apparatus, said moving member operably extending into the interior of said spool and being moveable therein,
a hole in said spool through which said scribing marks on said moving member are visible, and a housing removably secured to said spool about said hole, said illuminating means and said optical sensing means disposed in said housing to face said hole in said spool to view said scribing marks of said moving member.

33. The sensor of claim 32 wherein,
said mechanical device is a ram blowout preventer,
said moving member is an extension of a piston shaft of said ram blowout preventer,
said scribing marks are disposed on said extension of said ram shaft,
said spool is attached to said ram blowout preventer,
said piston shaft is free to translate within said spool, and
said scribing marks are visible through said hole in said spool.

34. The sensor of claim 33 wherein said housing includes,
sealing means for sealing the interior of said housing from subsea water pressure, and
connector means for connecting an electrical cable external to said housing to electrical cable external to said housing to electrical leads of said optical sensing means and said illuminating means inside said housing.

35. The sensor of claim 34 wherein,
a lens board is disposed within said housing to face said hole in said spool, and
said illuminating means includes six light emitting diodes securely disposed circularly about a central aperture in said lens board.

36. The sensor of claim 35 wherein said optical sensing means includes,
a dynamic random access memory mounted in a semiconductor package having a transparent lid, said memory mounted where said transparent lid faces said central aperture of said lens board, and
lens means disposed in said central aperture of said lens board for focusing an image from said scribing marks on said movable member via said spool hole onto said dynamic random access memory.

* * * * *